(12) United States Patent
Cai et al.

(10) Patent No.: US 10,005,921 B2
(45) Date of Patent: Jun. 26, 2018

(54) COATING COMPOSITION WITH IMPROVED LIQUID STAIN REPELLENCY AND PROCESS FOR MAKING THE SAME

(71) Applicant: Rohm and Haas Company, Philadelphia, PA (US)

(72) Inventors: Qiaoqiao Cai, Shanghai (CN); Xiangting Dong, Shanghai (CN); Juan Li, Shanghai (CN); Tao Wang, Shanghai (CN); Tingke Zhang, Shanghai (CN)

(73) Assignee: ROHM AND HAAS COMPANY, Philadelphia, PA (US)

( * ) Notice: Subject to any disclaimer, the term of this patent is extended or adjusted under 35 U.S.C. 154(b) by 0 days. days.

(21) Appl. No.: 15/021,082

(22) PCT Filed: Oct. 10, 2013

(86) PCT No.: PCT/CN2013/084942
§ 371 (c)(1),
(2) Date: Mar. 10, 2016

(87) PCT Pub. No.: WO2015/051513
PCT Pub. Date: Apr. 16, 2015

(65) Prior Publication Data
US 2016/0222246 A1    Aug. 4, 2016

(51) Int. Cl.
| C09D 133/26 | (2006.01) |
| C09D 125/14 | (2006.01) |
| C09D 133/08 | (2006.01) |
| C08F 218/08 | (2006.01) |

(52) U.S. Cl.
CPC .......... *C09D 133/26* (2013.01); *C08F 218/08* (2013.01); *C09D 125/14* (2013.01); *C09D 133/08* (2013.01)

(58) Field of Classification Search
CPC .................................................. C09D 133/26
See application file for complete search history.

(56) References Cited

U.S. PATENT DOCUMENTS

| 3,300,429 A | * | 1/1967 | Glavis | C09D 125/00 |
| | | | | 428/515 |
| 3,687,884 A | * | 8/1972 | Huang | C08F 218/08 |
| | | | | 524/460 |
| 4,219,454 A | | 8/1980 | Iacoviello et al. | |
| 4,368,077 A | | 1/1983 | Ceska et al. | |
| 5,087,487 A | | 2/1992 | Katz et al. | |
| 6,472,462 B1 | | 10/2002 | Kohlhammer et al. | |
| 7,357,949 B2 | | 4/2008 | Trogolo et al. | |
| 7,579,081 B2 | | 8/2009 | Brown | |
| 8,617,302 B2 | | 12/2013 | Okuda et al. | |
| 8,987,350 B2 | | 3/2015 | Li et al. | |
| 2006/0188656 A1 | * | 8/2006 | Katsuta | C09D 133/14 |
| | | | | 427/407.1 |
| 2010/0167609 A1 | | 7/2010 | McLennan et al. | |
| 2010/0167610 A1 | | 7/2010 | McLennan et al. | |
| 2010/0210776 A1 | | 8/2010 | Mosquet et al. | |
| 2010/0330279 A1 | | 12/2010 | Fogden et al. | |
| 2012/0035430 A1 | | 2/2012 | Roth | |
| 2012/0264859 A1 | | 10/2012 | Xu et al. | |
| 2013/0035430 A1 | | 2/2013 | Li et al. | |
| 2013/0085222 A1 | | 4/2013 | Fasano et al. | |
| 2013/0338299 A1 | | 12/2013 | Belmonte Rodrigues De Castro et al. | |
| 2016/0230034 A1 | | 8/2016 | Cai et al. | |

FOREIGN PATENT DOCUMENTS

| CN | 1097446 A | 1/1995 |
| CN | 101024741 A | 8/2007 |
| GB | 1158733 A | 7/1969 |
| GB | 3687884 A | 7/1969 |
| WO | 1997047399 A1 | 12/1997 |
| WO | 2010074865 A1 | 7/2010 |
| WO | 2013093632 A2 | 6/2013 |
| WO | 2015051514 A1 | 4/2015 |

OTHER PUBLICATIONS

International Search Report for International Application No. PCT/CN2013/084942; dated Jun. 9, 2014; dated Jun. 25, 2014; 3 Pages.
Smith et al.; New vinyl ester monomers for emulsion polymers:; Progress in Organic Coatings; vol. 22; (1993) pp. 19-25.
Written Opinion of the International Searching Authority for International Application No. PCT/CN2013/084942; dated Jun. 18, 2014; dated Jun. 25, 2014; 4 Pages.

* cited by examiner

*Primary Examiner* — Robert Harlan
(74) *Attorney, Agent, or Firm* — Karl E. Stauss; Cantor Colburn LLP

(57) ABSTRACT

A new coating composition comprising, by dry weight based on the total dry weight of the coating composition, i) from 12% to 80% of polymer particles comprising, as polymerized units, by dry weight based on the total dry weight of the polymer particles, from 3% to 70% of a vinyl acetate; from 2% to 65% of a styrene; and from 20% to 55% of (meth)acrylate monomers; ii) from 0.1% to 6% of a wax; and iii) from 14% to 55% of a pigment. A process for making the coating composition.

10 Claims, No Drawings

COATING COMPOSITION WITH IMPROVED LIQUID STAIN REPELLENCY AND PROCESS FOR MAKING THE SAME

FIELD OF THE INVENTION

The present invention relates to a coating composition with improved liquid stain repellency and a process for making the same.

INTRODUCTION

Stain repellency, especially liquid stain repellency, is one of the key performance requirements for coating films. Stain repellency is the resistance to stains, including resistance to being wetted by liquid stain, resistance to being adhered by stains, and/or ease of stain removal.

Stain repellency is achievable by the appropriate selection of binders and additives in a coating formulation. Wax is the most commonly used additive. Wax tends to migrate to the surface of dry coating films and reduces their surface tension, thereby improving their stain repellency.

Vinyl acetate (VA) is a relatively inexpensive monomer and its polymers with ethylene or acrylic monomers are usually used as a binder for architectural coatings. Because of its hydrophilicity, it is not commonly used in coating formulations with liquid stain repellency requirement. VA-based coating films tend to be more hydrophilic and therefore usually have poorer liquid stain repellency. To overcome it, more wax is needed in the formulations.

It is therefore still desired in the technical art a coating composition with improved liquid stain repellency. It is also desired that this coating composition comprises a VA-based binder and a relatively low wax content.

SUMMARY OF THE INVENTION

The present invention provides a coating composition comprising, by dry weight based on the total dry weight of the coating composition, i) from 12% to 80% of polymer particles comprising, as polymerized units, by dry weight based on the total dry weight of the polymer particles, from 3% to 70% of a vinyl acetate; from 2% to 65% of a styrene; and from 20% to 55% of (meth)acrylate monomers; ii) from 0.1% to 6% of a wax; and iii) from 14% to 55% of a pigment.

In a preferred embodiment, the polymer particles further comprise, as polymerized units, from 0.1% to 40% by dry weight based on the total dry weight of the polymer particles, of a vinyl ester of versatic acid and/or a vinyl ester of 2-ethyl hexanoic acid.

The present invention further provides a two-stage polymerization process for making the coating composition.

DETAILED DESCRIPTION OF THE INVENTION

The coating composition of the present invention comprises, by dry weight based on the total dry weight of the coating composition, from 12% to 80%, preferably from 15% to 70%, and more preferably from 20% to 60%, of polymer particles; from 0.1% to 6%, preferably from 0.3% to 4%, and more preferably from 0.6% to 3%, of a wax; and from 14% to 55%, preferably from 17% to 50%, and more preferably from 20% to 40%, of a pigment.

In a preferred embodiment, the coating composition of the present invention further comprises from 0.1% to 70%, preferably from 0.5% to 60%, and more preferably from 1% to 50%, by dry weight based on total dry weight of the coating composition, of an extender.

Polymer Particles

The polymer particles comprises, as polymerized units, by dry weight based on the total dry weight of the polymer particles, from 3% to 70%, preferably from 10% to 65%, and more preferably from 30% to 60%, of a vinyl acetate; from 2% to 65%, preferably from 3% to 40%, and more preferably from 5% to 20%, of a styrene; and from 20% to 55%, preferably from 25% to 50%, and more preferably from 30% to 40%, of (meth)acrylate monomers.

Suitable examples of the (meth)acrylate monomers include butyl (meth)acrylate, ethylhexyl (meth)acrylate, ethyl (meth)acrylate, methyl methacrylate, n-heptyl (meth)acrylate, n-octyl (meth)acrylate, n-nonyl (meth)acrylate, n-decyl (meth)acrylate, stearyl (meth)acrylate, lauryl (meth)acrylate, maleic anhydride, and acrylonitrile.

In a preferred embodiment, the polymer particles of the present invention further comprises, as polymerized units, from 0.1% to 40%, preferably from 0.5% to 20%, and more preferably from 1% to 10%, by dry weight based on the total dry weight of the polymer particles, of a vinyl ester of versatic acid and/or a vinyl ester of 2-ethyl hexanoic acid.

The vinyl ester of versatic acid is a compound having a formula (I):

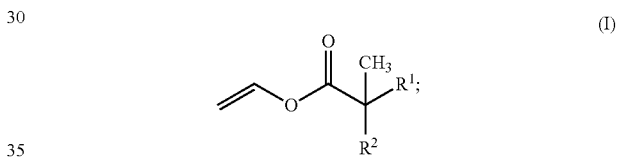

wherein $R^1$ or $R^2$ is each independently $C_1$-$C_{10}$ alkyl. Suitable examples include the formula (I) compound with $R^1$ and $R^2$ being alkyl groups each containing a total of 6 carbon atoms, and the formula (I) compound with $R^1$ and $R^2$ being alkyl groups each containing a total of 7 carbon atoms, respectively as commercially available under the trademarks of VEOVA™ 10, and VEOVA 9 from Momentive Specialty Chemicals Management (Shanghai) Co., Ltd.

The vinyl ester of 2-ethyl hexanoic acid is a compound having a formula (II):

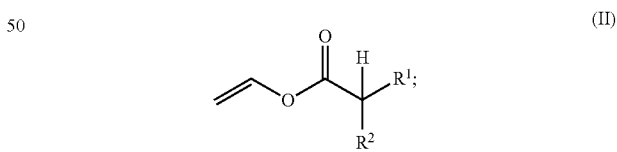

wherein $R^1$ is a $C_4$ alkyl, and $R^2$ is a $C_2$ alkyl. Suitable example is commercially available under the trademark of VEOVA EH from Momentive Specialty Chemicals Management (Shanghai) Co., Ltd.

In a preferred embodiment, the polymer particles further comprise, as polymerized units, from 0.01% to 2%, preferably from 0.05% to 1.5%, and most preferably from 0.1% to 1%, by dry weight based on the total dry weight of the polymer particles, of a stabilizer monomer.

In the binder composition further comprises, from 0.01% to 5%, preferably from 0.05% to 3%, and most preferably from 0.1% to 2%, by dry weight based on the total dry weight of the polymer particles, of a colloidal stabilizer.

Suitable examples of the colloidal stabilizer include hydroxyethyl cellulose (HEC) and its derivatives, and polyvinyl alcohol (PVOH).

Suitable examples of the stabilizer monomer include sodium styrene sulfonate (SSS), sodium vinyl sulfonate (SVS), 2-acrylamido-2-methylpropanesulfonic acid (AMPS), acrylamide (AM), acrylic acid (AA), methylacrylic acid (MAA), and itaconic acid (IA).

The polymerization of the polymer particles can be any method known in the art, including emulsion polymerization, mini-emulsion polymerization, and mechanical dispersing technology. Suitable examples of polymerization process include those disclosed in U.S. Pat. Nos. 7,579,081 B2, 7,357,949 B2 and WO 2010074865 A1.

In a preferred embodiment, the polymer particles of the present invention are prepared by a two-stage polymerization method. It comprises a first stage of polymerizing the vinyl acetate and the (meth)acrylate monomers, and a second stage of polymerizing the resulting product of the first stage polymerization and styrene.

Wax

The wax used in the present invention is preferably a paraffin wax, and more preferably a melted refined paraffin wax or its blend with other materials such as polyethylene wax, carnauba wax, or ethylene acrylic acid. The preferred wax has a melt point temperature of 46 to 71° C.

Wax can be added into the coating composition as a wax emulsion, or added by dissolving into the monomers as in U.S. Pat. No. 4,368,077, or added by blending with other coating components.

Suitable examples of the wax include wax emulsions such as MICHEM™ Emulsion 62330 (a blend emulsion of paraffin wax and polyethylene), MICHEM Emulsion 34935 (a blend emulsion of paraffin wax and ethylene acrylic acid), MICHEM Lube 180 (a blend emulsion of paraffin wax and carnauba wax), MICHEM Emulsion 70950, and MICHEM Emulsion 71450 commercially available from Michaelman Inc., and ULTRALUBE™ E-340 commercially available from Keim Additec Surface GmbH.

The wax emulsion can be prepared by melting refined wax to a temperature above its melting point (the elevated temperature). Appropriate emulsifiers such as stearic acid, oleic acid, diethylamine ethanol, 2-amino-2-methyl-1-propanol, can then be stirred into the molten wax at the elevated temperature. A base, such as potassium hydroxide or ammonium hydroxide, can separately be dissolved in ethylene glycol or water at the elevated temperature and then slowly added to the molten wax with an increasing agitation speed of the mixer. After all the water/base mixture has been added to the molten wax, the resulting wax emulsion can be passed through a homogenizer. After homogenization, the resulting wax emulsion is cooled, for example, through a heat exchanger, and then filtered and packaged.

Pigments and Extenders

Pigments of the present invention are typically inorganic pigment particles, and preferably particulate inorganic materials which are capable of materially contributing to the opacity or hiding capability of a coating. Such materials typically have a refractive index of equal to or greater than 1.8, and include titanium dioxide ($TiO_2$), zinc oxide, zinc sulfide, barium sulfate, and barium carbonate. Titanium dioxide ($TiO_2$) is preferred.

Extenders are typically particulate inorganic materials having a refractive index of less than or equal to 1.8 and greater than 1.3 and include calcium carbonate, clay, calcium sulfate, aluminosilicate, silicate, zeolite, mica, diatomaceous earth, solid or hollow glass, and ceramic bead.

Coating Composition Additives

The coating composition of the present invention may further contain at least one conventional coating additives such as coalescing agents, cosolvents, surfactants, buffers, neutralizers, thickeners, non-thickening rheology modifiers, dispersants, humectants, wetting agents, mildewcides, biocides, plasticizers, antifoaming agents, defoaming agents, anti-skinning agents, colorants, flowing agents, crosslinkers, and anti-oxidants. The uses of these additives are common knowledge in the art.

Preparation of the Coating Composition

The preparation of the coating composition involves the process of selecting and admixing appropriate coating ingredients in the correct proportions to provide a coating with specific processing and handling properties, as well as a final dry coating film with the desired properties.

Application of the Coating Composition

The coating composition may be applied by conventional application methods such as brushing, roller application, and spraying methods such as air-atomized spray, air-assisted spray, airless spray, high volume low pressure spray, and air-assisted airless spray.

Suitable substrates include concrete, cement board, medium-density fiberboard (MDF) and particle board, gypsum board, wood, stone, metal, plastics, wall paper and textile. Preferably, all the substrates are pre-primed by waterborne or solvent borne primers.

EXAMPLES

I. Raw Materials

TABLE 1a

| Compound | Company |
|---|---|
| DISPONIL ™ FES-32 surfactant (FES-32) | BASF Chemical Co., Ltd. |
| ECOSURF ™ SA-9 surfactant (SA-9) | The Dow Chemical Company |
| CELLOSIZE ™ QP-3L stabilizer (QP-3L) | The Dow Chemical Company |
| TERGITOL ™ 15-S-40 surfactant (15-S- | The Dow Chemical Company |
| VEOVA ™ 10 monomer | Momentive Specialty Chemicals Management (Shanghai) Co., Ltd. |
| SILQUEST ™ A-171 Cross-linker (A-171) | Momentive Specialty Chemicals Management (Shanghai) Co., Ltd. |
| PRIMAL ™ E-2086 binder (E-2086) | The Dow Chemical Company |
| TEGO ™ Foamex 825 deformer | Evonik Degussa (China) Co., Ltd. |
| KATHON ™ LXE biocide | The Dow Chemical Company |
| NOPCO ™ NXZ defoamer | San Nopco Ltd. |
| AMP-95 base | The Dow Chemical Company |

TABLE 1a-continued

| Compound | Company |
|---|---|
| OROTAN™ 1288 dispersant | The Dow Chemical Company |
| TRITON™ EF-106 wetting agent | The Dow Chemical Company |
| ACRYSOL™ TT-935 rheology modifier | The Dow Chemical Company |
| NATROSOL™ 250 HBR rheology | Aqualon Biotechnology Co., Ltd. |
| TI-PURE™ R-706 pigment | Dupont China Holding Co., Ltd. |
| CC-700 extender | Guangfu Building Materials Group (China) |
| CC-1000 extender | Guangfu Building Materials Group (China) |
| TEXANOL™ coalescent | Eastman Chemical Company |
| ULTRALUBE™ E-340 wax emulsion | Keim Additec Surface GmbH |

TABLE 1b

Abbreviation

| Compound | Chemical description |
|---|---|
| SVS | sodium vinyl sulfonate (25% active) |
| SSS | sodium styrene sulfonate |
| AMPS | 2-acrylamido-2-methylpropanesulfonic acid |
| BA | butyl acrylate |
| VA | vinyl acetate |
| ST | styrene |
| AM | acrylamide |
| MAA | methylacrylic acid |
| AA | acrylic acid |
| IA | itaconic acid |
| SPS | sodium persulfate |
| IAA | isoascorbic acid |
| SBS | sodium bisulfite |
| t-BHP | t-butyl hydroperoxide |
| EDTA | ethylenediaminetetraacetic acid |

II. Test Procedures

Liquid Stain Repellency

Liquid stain repellency evaluates the difficulty of wetting a coating surface with liquid stains. To determine the liquid stain repellency, test coatings were casted on black vinyl charts (The Leneta Co., Form P121-10N Leneta Scrub Test Panels), or on substrates of ceramic, metal, plastic and cementitious panels. The coatings were dried for 7 days. The coated substrates were kept vertically so that the liquid stain drops flew from the upper to the bottom side of substrates coated with the test coatings. Liquid stain repellency was observed by naked eyes and was represented by the liquid stain repellency scores shown in Table 2.

TABLE 2

| Score | State |
|---|---|
| 10 | No wetting nor adhesion of water droplets observed on the coating surface |
| 8 | ⅓ wetting area observed by individual small circular water |
| 6 | ¾ wetting area observed by individual small circular water |
| 5 | Wetting observed by individual small circular water droplets observed on the coating surface |
| 4 | Wetting observed by individual small elliptic water droplets observed on the coating surface |
| 3 | Wetting observed by individual large water droplets observed on the coating surface |
| 2 | Wetting observed along the discrete track of hydrophilic stains on the coating surface |
| 1 | Wetting observed along the thinner track of hydrophilic stains on the coating surface |
| 0 | Wetting observed along the entire track of hydrophilic stains on coating surface |

III. Examples

Dispersions of Polymer Particles

Dispersion 1

The polymerization was a two-stage polymerization and involved a first stage monomer emulsion and a second stage monomer emulsion. The first stage monomer emulsion was prepared by first mixing 415 g DI water, 17.13 g FES-32 and 11.09 g 15-S-40, and followed by adding 14.16 g SVS, 8.93 g AM, 1.46 g A-171, 1226.68 g VA and 538.24 g BA. The second monomer emulsion was prepared by first mixing 22 g DI water, 3.00 g FES-32, and followed by adding 0.94 g GMAA, 52.40 g BA and 40.20 g ST.

16.80 g FES-32, 18.68 g SA-9 and 3.74 g QP-3L and 736.02 g DI water were charged to a 5 L 4-necked round bottom flask equipped with a mechanical stirrer, a nitrogen gas blanket, a thermometer, a condenser, a heating mantel and a temperature controller. The contents of the flask were heated to 84° C. under a nitrogen atmosphere. 0.026 g $FeSO_4.7H_2O$ (dry weight), 0.18 g EDTA (dry weight) and 8.53 g DI water were added to the stirred flask, and followed by adding 4.21 g SPS and a solution of 0.38 g sodium acetate in 37.55 g DI water, and rinsed with 4.74 g DI water. The first stage monomer emulsion, a solution of 3.43 g SPS dissolved in 62.86 g DI water and a solution of 0.75 g IAA and 2.78 g sodium acetate in 62.86 g DI water were then added to the flask over 140 minutes. Reaction temperature was maintained at 75° C. 40 g DI water was used to rinse the emulsion feed line and 10 g DI water was used to rinse the co-feed lines. The flask was held for 20 minutes. After the contents of the reactor were cooled to 70° C., 1.89 g t-BHP in 15.82 g DI water, and 1.45 g SBS in 15.82 g DI water were added to the flask over 30 minutes, and 3.32 g DI water was used to rinse the chaser lines Ammonia was added to adjust the pH to about 8.0 and the flask was held for 5 minutes.

The second stage monomer emulsion was shot into kettle, and then a solution of 1.70 g t-BHP in 16.66 g DI water and a solution of 0.90 g IAA in 17.66 g DI water were added to the flask over 10 minutes. Temperature was kept at 62 to 75° C. 30 g DI water was used to rinse the tank and co-feed lines. PRIMAL™ E-2086 binder was then shot into the flask.

The flask temperature was cooled to 65° C., and 2.48 g t-BHP in 17.49 g DI water, then 1.31 g IAA in 20.14 g DI water were added to the flask over 50 minutes. The flask was held for 10 minutes. The flask temperature was cooled to 60° C., and 1.70 g t-BHP in 16.66 g DI water, then 0.90 g IAA in 17.66 g DI water were added to the flask over 30 minutes. Then the flask was held for another 10 minutes.

When the flask temperature was lower than 45° C., the solution of 12.22 g KATHON™ LXE biocide in 6.99 g DI water and 1.2 g FOAMASTER™ NXZ defoamer were added to the flask. Gel was removed by filter and the resulting dispersion 1 had a 52.70% solid and a 258 nm particle size.

Dispersion 2

In a similar procedure as in preparing dispersion 1, dispersion 2 was prepared. The first stage monomer emulsion contained 1032.99 g VA, 452.41 g BA, 11.92 g SVS, 7.52 g AM, and 1.23 g A-171. The second stage monomer emulsion containing 93.48 g ST, 276.95 g BA and 3.76 g GMAA. The resulting dispersion 2 had a 54.39 wt % solid and a 274 nm particle size.

Dispersion 3

In a similar procedure as in preparing dispersion 1, dispersion 3 was prepared. The first stage monomer emulsion contained 129.11 g VA, 56.69 g BA, 0.38 g SVS, and 0.94 g AM. The second stage monomer emulsion containing 706.82 g ST, 943.37 g BA and 33.79 g GAA. The resulting dispersion 3 had a 48.32 wt % solid and a 215 nm particle size.

Dispersion 4

In a similar procedure as in preparing dispersion 1, dispersion 4 was prepared. The first stage monomer emulsion contained 64.55 g VA, 28.34 g BA, 0.19 g SVS, and 0.47 g AM. The second stage monomer emulsion contained 746.02 g ST, 995.70 g BA and 35.67 g GAA. The resulting dispersion 3 had a 48.75 wt % solid and a 237 nm particle size.

Dispersion 5

In a similar procedure as in preparing dispersion 1, dispersion 5 was prepared. The first stage monomer emulsion contained 1032.99 g VA, 226.21 g BA, 225.07 g VEOVA 10, 11.92 g SVS, 7.52 g AM, and 1.23 g A-171. The second stage monomer emulsion containing 93.48 g ST, 276.95 g BA and 3.76 g GMAA. The resulting dispersion 5 had a 53.95 wt % solid and a 350 nm particle size.

Dispersion 6

Dispersion 6 is a polymer particle dispersion comprising, by dry weight, 15% BA and 85% VA.

The compositions of the dispersions were summarized in Table 3.

TABLE 3

| Dispersion | monomers (dry weight % based on the total dry weight of the polymer particles) | | | | | | | | |
| --- | --- | --- | --- | --- | --- | --- | --- | --- | --- |
| | VA | ST | BA | VEOVA 10 | SVS | MAA | AA | AM | A-171 |
| 1 | 65.55 | 2.15 | 31.5 | — | 0.19 | 0.05 | — | 0.475 | 0.076 |
| 2 | 55.2 | 5 | 39.0 | — | 0.16 | 0.2 | — | 0.4 | 0.064 |
| 3 | 6.9 | 37.8 | 53.4 | — | 0.02 | — | 1.8 | 0.05 | 0.008 |
| 4 | 3.45 | 60.8 | 33.8 | — | 0.01 | — | 1.9 | 0.025 | 0.004 |
| 5 | 55.2 | 5 | 26.9 | 12.1 | 0.16 | 0.2 | — | 0.4 | 0.064 |
| 6 | 85 | — | 15 | — | — | — | — | — | — |

TABLE 4

| Material | Weight (g) |
| --- | --- |
| Coating formulation | |
| Grind | |
| Water | 110.19 |
| NATROSOL ™ 250 HBR rheology modifier | 2.00 |
| AMP-95 base | 0.51 |
| OROTAN ™ 1288 dispersant | 3.22 |
| KATHON ™ LXE biocide | 1.00 |
| TRITON ™ EF-106 wetting agent | 1.00 |
| FOAMASTER ™ NXZ defoamer | 1.00 |
| TI-PURE ™ R-706 pigment | 149.33 |
| CC-1000 extender | 33.58 |
| CC-700 extender | 105.90 |
| Letdown | |
| Dispersion 1 | 351.58 |
| TEXANOL ™ coalescent | 12.97 |
| TEGO ™ Foamex 825 deformer | 1.00 |
| AMP-95 base | 0.4 |
| KATHON ™ LXE biocide | 1.00 |
| Water | 176.08 |
| ACRYSOL ™ TT-935 rheology modifier | 9.24 |
| ULTRALUBE ™ E-340 wax emulsion | 40 |
| Total | 1000 |
| Coating characteristics | |
| Total PVC | 35.7% |
| Volume solids | 32.23% |
| Weight solids | 47.41% |

Coating 2

Coating 2 containing dispersion 1 was prepared following the procedure of preparing Coating 1 except that the paraffin wax emulsion (ULTRALUBE™ E-340) loading in Coating 2 was 3%. In addition, appropriate adjustment of weights of ACRYSOL TT-935 rheology modifier and AMP-95 base in letdown process was done such that the resulting coating had a KU viscosity of 90 to 95, and a pH of 8.5 to 9.0. In addition, appropriate adjustments of water and binder Coating Compositions Coating 1

A coating containing dispersion 1 was prepared using the ingredients listed in Table 4. Grind materials were mixed using a high speed Cowles disperser, and letdown materials were added using a conventional lab mixer. Appropriate adjustment of weights of ACRYSOL™ TT-935 rheology modifier and AMP-95 base in letdown process was done such that the resulting coating had a KU viscosity of 90 to 95, and a pH of 8.5 to 9.0. The PVC of the resulting coating was 35.7%. The volume solid of the resulting coating was 32.2%.

weights were done such that the resulting coating had a volume solid of 32.2% and a PVC of 35.7%.

Coating 3 to Coating 9

Coating 3 to Coating 9 containing dispersion 2 to dispersion 6 (as shown in Table 5) were prepared following the procedure of preparing Coating 1 except that the paraffin wax emulsion (ULTRALUBE E-340) loadings in Coatings 3 to 9 were respectively 4%, 3%, 1%, 0.4%, 0.2% and 5%. Appropriate adjustment of weights of ACRYSOL TT-935 rheology modifier and AMP-95 base in letdown process was done such that the resulting coatings had KU viscosities of 90 to 95, and pHs of 8.5 to 9.0. In addition, appropriate adjustments of water and binder weights were done such that the resulting coatings had volume solids of 32.2% and PVCs of 35.7%.

Coating 9 was a comparative example.

TABLE 5

| Coatings | Dispersions | Wax (dry weight % based on the total dry weight of the coating composition) | Liquid stain repellency (film dried for 4 days at RT) |
|---|---|---|---|
| 1 | 1 | 4.22% | 6 |
| 2 | 1 | 3.16% | 6 |
| 3 | 2 | 4.22% | 4 |
| 4 | 2 | 3.16% | 4 |
| 5 | 3 | 1.05% | 2 |
| 6 | 4 | 1.05% | 5 |
| 7 | 4 | 0.42% | 5 |
| 8 | 5 | 0.42% | 4 |
| 9* | 6 | 4.22% | 1 |

*Comparative example.

The results in the above table indicated that coatings 1-8, comprising respectively dispersions 1-5 provided good liquid stain repellency. Coating 9 was a comparative example comprising dispersion 6 consisted of 15% BA and 85% VA. Without using ST, coating 9 compared to coating 1 (same wax loading as in coating 9), had poorer liquid stain repellency. Coating 6 compared to coating 5, had a higher ST loading in the polymer particles, and resulted in better liquid stain repellency even when the wax loadings were the same. Coating 8 comprising VEOVA 10, compared to coating 3 (same ST loadings), achieved similar liquid stain repellency with a lower wax loading. Coating 7 compared to coating 4, had a higher ST loading, and a lower wax loading to achieve similar liquid stain repellency.

What is claimed is:

1. A coating composition comprising, by dry weight based on total dry weight of the coating composition,
   i) from 12% to 80% of polymer particles comprising, as polymerized units, by dry weight based on the total dry weight of the polymer particles,
      from 3% to 70% of a vinyl acetate;
      from 2% to 65% of a styrene; and
      from 20% to 55% of (meth)acrylate monomers;
   ii) from 0.1% to 6% of a wax having a melt temperature of 46 to 71° C., and wherein the wax is provided as a wax emulsion; and
   iii) from 14% to 55% of a pigment.

2. The coating composition according to claim 1 wherein the polymer particles comprise, as polymerized units, by dry weight based on the total dry weight of the polymer particles,
   from 10% to 65% of the vinyl acetate;
   from 3% to 40% of the styrene; and
   from 25% to 50% of the (meth)acrylate monomers.

3. The coating composition according to claim 1 further comprising from 0.1% to 70%, by dry weight based on total dry weight of the coating composition, of an extender.

4. The coating composition according to claim 1 wherein the polymer particles further comprise, as polymerized units, from 0.1% to 40% by dry weight based on the total dry weight of the polymer particles, of a vinyl ester of versatic acid and/or a vinyl ester of 2-ethyl hexanoic acid; wherein the vinyl ester of versatic acid is a compound having a formula (I):

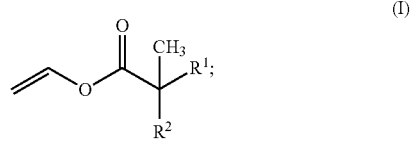

wherein $R^1$ or $R^2$ is each independently $C_1$-$C_{10}$ alkyl; and the vinyl ester of 2-ethyl hexanoic acid is a compound having a formula (II):

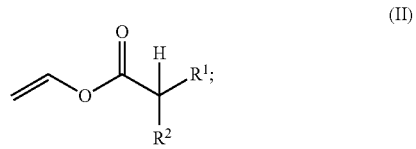

wherein $R^1$ is a $C_4$ alkyl, and $R^2$ is a $C_2$ alkyl.

5. The coating composition according to claim 4 wherein the vinyl ester of versatic acid and/or the vinyl ester of 2-ethyl hexanoic acid is present from 0.5% to 20% by dry weight based on the total dry weight of the polymer particles.

6. The coating composition according claim 4 wherein $R^1$ and $R^2$ of formula (I) are alkyl groups each containing a total of 6 carbon atoms, or alkyl groups each containing a total of 7 carbon atoms.

7. The binder composition according to claim 1 wherein the polymer particles further comprise, as polymerized units, from 0.01% to 2% by dry weight based on the total dry weight of the polymer particles, of a stabilizer monomer.

8. The binder composition according to claim 1 wherein it further comprises, from 0.01% to 5% by dry weight based on the total dry weight of the polymer particles, of a colloidal stabilizer.

9. A process for making the coating composition according to claim 1 wherein the polymer particles are prepared by a two-stage polymerization comprising a first stage of polymerizing the vinyl acetate and the (meth)acrylate monomers, and a second stage of polymerizing the resulting product of the first stage polymerization and styrene.

10. The coating composition according to claim 5 wherein $R^1$ and $R^2$ of formula (I) are alkyl groups each containing a total of 6 carbon atoms, or alkyl groups each containing a total of 7 carbon atoms.

* * * * *